(12) United States Patent
Lawrence et al.

(10) Patent No.: US 8,140,415 B2
(45) Date of Patent: Mar. 20, 2012

(54) AUTOMATED GLOBAL RISK MANAGEMENT

(75) Inventors: David Lawrence, New York, NY (US); Ajay Junnarkar, New York, NY (US)

(73) Assignee: Goldman Sachs & Co., New York, NY (US)

( * ) Notice: Subject to any disclaimer, the term of this patent is extended or adjusted under 35 U.S.C. 154(b) by 934 days.

(21) Appl. No.: 09/812,627

(22) Filed: Mar. 20, 2001

(65) Prior Publication Data

US 2002/0138407 A1    Sep. 26, 2002

(51) Int. Cl.
*G06Q 40/00*    (2006.01)
(52) U.S. Cl. ......... 705/35; 705/36 R; 705/36 T; 705/37; 705/38; 705/39; 235/440
(58) Field of Classification Search ............. 705/35–39; 235/440
See application file for complete search history.

(56) References Cited

U.S. PATENT DOCUMENTS

| | | |
|---|---|---|
| 4,326,259 A | 4/1982 | Cooper et al. |
| 4,346,442 A | 8/1982 | Musmanno |
| 4,376,978 A | 3/1983 | Musmanno |
| 4,386,233 A | 5/1983 | Smid et al. |
| 4,597,046 A | 6/1986 | Musmanno et al. |
| 4,718,009 A | 1/1988 | Cuervo |
| 4,727,243 A | 2/1988 | Savar |
| 4,734,564 A | 3/1988 | Boston et al. |
| 4,736,294 A | 4/1988 | Gill et al. |
| 4,773,663 A | 9/1988 | Sawyer et al. |
| 4,774,664 A | 9/1988 | Campbell et al. |
| 4,812,628 A | 3/1989 | Boston et al. |
| 4,868,866 A | 9/1989 | Williams, Jr. |
| 4,924,587 A | 5/1990 | Spruce et al. |
| 4,953,085 A | 8/1990 | Atkins |
| 4,989,141 A | 1/1991 | Lyons et al. |
| 5,025,138 A | 6/1991 | Cuervo |
| 5,038,284 A | 8/1991 | Kramer |
| 5,068,888 A | 11/1991 | Scherk et al. |
| 5,161,103 A | 11/1992 | Kosaka et al. |

(Continued)

FOREIGN PATENT DOCUMENTS

CA    2441211    9/2003

(Continued)

OTHER PUBLICATIONS

JP020000020618A (Yamazaki et al.), Jan. 21, 2000, see abstract.

(Continued)

*Primary Examiner* — Narayanswamy Subramanian
(74) *Attorney, Agent, or Firm* — Chadbourne & Parke LLP; John A. Squires (57) ABSTRACT

A computerized risk management method and system for facilitating analysis and quantification of risk associated with a financial transaction. An automated global risk management system maintains a database relating risk variables including world events government advisories, and other information sources with potential risk for a financial institution. The system generates a risk quotient or other rating based upon a weighted algorithm applied to the criteria, wherein the risk quotient is indicative of risk associated with a financial transaction or account. The quotient can be monitored on a periodic basis, during the course of a transaction, or on demand. Actions commensurate with a risk quotient can be presented to a financial institution to help the institution properly manage risk associated with a particular entity or transaction. A log or other stored history can be created such that utilization of the system can mitigate adverse effects relating to a problematic account.

25 Claims, 6 Drawing Sheets

U.S. PATENT DOCUMENTS

| | | | |
|---|---|---|---|
| 5,177,342 A | 1/1993 | Adams | |
| 5,210,687 A | 5/1993 | Wolfberg et al. | |
| 5,239,462 A | 8/1993 | Jones et al. | |
| 5,274,547 A | 12/1993 | Zoffel et al. | |
| 5,323,315 A | 6/1994 | Highbloom | |
| 5,347,632 A | 9/1994 | Filepp et al. | |
| 5,398,300 A | 3/1995 | Levey | |
| 5,432,542 A | 7/1995 | Thibadeau et al. | |
| 5,444,819 A | 8/1995 | Negishi | |
| 5,446,885 A | 8/1995 | Moore et al. | |
| 5,448,047 A * | 9/1995 | Nair et al. | 235/440 |
| 5,453,601 A | 9/1995 | Rosen | |
| 5,455,407 A | 10/1995 | Rosen | |
| 5,457,305 A | 10/1995 | Akel et al. | |
| 5,557,518 A | 9/1996 | Rosen | |
| 5,565,909 A | 10/1996 | Thibadeau et al. | |
| 5,627,886 A | 5/1997 | Bowman | |
| 5,648,900 A | 7/1997 | Bowen et al. | |
| 5,649,116 A | 7/1997 | McCoy et al. | |
| 5,671,279 A | 9/1997 | Elgamal | |
| 5,679,938 A | 10/1997 | Templeton et al. | |
| 5,679,940 A | 10/1997 | Templeton et al. | |
| 5,680,305 A | 10/1997 | Apgar, IV | |
| 5,689,652 A | 11/1997 | Lupien | |
| 5,696,907 A | 12/1997 | Tom | |
| 5,703,045 A | 12/1997 | Lewis et al. | |
| 5,717,923 A | 2/1998 | Dedrick | |
| 5,732,397 A | 3/1998 | DeTore et al. | |
| 5,732,400 A | 3/1998 | Mandler et al. | |
| 5,787,402 A | 7/1998 | Potter et al. | |
| 5,790,639 A | 8/1998 | Ranalli et al. | |
| 5,797,133 A | 8/1998 | Jones et al. | |
| 5,799,087 A | 8/1998 | Rosen | |
| 5,809,478 A | 9/1998 | Greco et al. | |
| 5,819,236 A | 10/1998 | Josephson | |
| 5,852,812 A | 12/1998 | Reeder | |
| 5,875,431 A | 2/1999 | Heckman et al. | |
| 5,878,400 A | 3/1999 | Carter, III | |
| 5,884,289 A | 3/1999 | Anderson et al. | |
| 5,898,154 A | 4/1999 | Rosen | |
| 5,903,882 A * | 5/1999 | Asay et al. | 705/44 |
| 5,920,629 A | 7/1999 | Rosen | |
| 5,933,816 A | 8/1999 | Zeanah et al. | |
| 5,940,812 A | 8/1999 | Tengel et al. | |
| 5,940,843 A | 8/1999 | Zucknovich et al. | |
| 5,953,423 A | 9/1999 | Rosen | |
| 5,963,648 A | 10/1999 | Rosen | |
| 5,963,923 A | 10/1999 | Garber | |
| 5,974,146 A | 10/1999 | Randle et al. | |
| 5,991,743 A | 11/1999 | Irving et al. | |
| 6,003,013 A | 12/1999 | Boushy et al. | |
| 6,014,228 A | 1/2000 | Castro | |
| 6,016,963 A | 1/2000 | Ezawa et al. | |
| 6,018,715 A | 1/2000 | Lynch et al. | |
| 6,018,723 A * | 1/2000 | Siegel et al. | 705/38 |
| 6,021,397 A | 2/2000 | Jones et al. | 705/36 |
| 6,047,887 A | 4/2000 | Rosen | |
| 6,078,904 A | 6/2000 | Rebane | |
| 6,078,905 A | 6/2000 | Pich-LeWinter | |
| 6,085,175 A | 7/2000 | Gugel et al. | |
| 6,088,686 A | 7/2000 | Walker et al. | |
| 6,105,007 A | 8/2000 | Norris | |
| 6,105,010 A | 8/2000 | Musgrave | |
| 6,119,103 A | 9/2000 | Basch et al. | |
| 6,148,297 A | 11/2000 | Swor et al. | |
| 6,148,301 A | 11/2000 | Rosenthal | |
| 6,199,073 B1 | 3/2001 | Peairs et al. | |
| 6,205,433 B1 | 3/2001 | Boesch et al. | |
| 6,219,805 B1 | 4/2001 | Jones et al. | |
| 6,236,972 B1 | 5/2001 | Shkedy | |
| 6,246,996 B1 | 6/2001 | Stein et al. | |
| 6,249,770 B1 | 6/2001 | Erwin et al. | |
| 6,278,983 B1 | 8/2001 | Ball | |
| 6,289,320 B1 | 9/2001 | Drummond et al. | |
| 6,304,915 B1 | 10/2001 | Nguyen et al. | |
| 6,304,973 B1 | 10/2001 | Williams | |
| 6,311,272 B1 | 10/2001 | Gressel | |
| 6,317,727 B1 | 11/2001 | May | |
| 6,321,212 B1 | 11/2001 | Lange | |
| 6,330,546 B1 | 12/2001 | Gopinathan et al. | |
| 6,341,267 B1 | 1/2002 | Taub | |
| 6,347,307 B1 | 2/2002 | Sandhu et al. | 705/36 |
| 6,393,423 B1 | 5/2002 | Goedken | |
| 6,415,271 B1 * | 7/2002 | Turk et al. | 705/39 |
| 6,456,984 B1 | 9/2002 | Demoff et al. | |
| 6,513,020 B1 | 1/2003 | Weiss et al. | |
| 6,516,056 B1 | 2/2003 | Justice et al. | |
| 6,542,905 B1 | 4/2003 | Fogel et al. | |
| 6,542,993 B1 | 4/2003 | Erfani | |
| 6,598,028 B1 | 7/2003 | Sullivan et al. | |
| 6,609,114 B1 | 8/2003 | Gressel et al. | |
| 6,609,658 B1 | 8/2003 | Sehr | |
| 6,658,393 B1 * | 12/2003 | Basch et al. | 705/38 |
| 6,658,400 B2 | 12/2003 | Perell et al. | |
| 6,671,818 B1 | 12/2003 | Mikurak | |
| 6,684,190 B1 | 1/2004 | Powers et al. | |
| 6,714,918 B2 | 3/2004 | Hillmer et al. | |
| 6,738,760 B1 * | 5/2004 | Krachman | 707/3 |
| 6,751,607 B2 | 6/2004 | Kraay et al. | |
| 6,757,898 B1 | 6/2004 | Ilsen et al. | |
| 6,785,661 B1 * | 8/2004 | Dixon et al. | 705/39 |
| 6,842,737 B1 | 1/2005 | Stiles et al. | |
| 6,868,408 B1 | 3/2005 | Rosen | |
| 6,898,574 B1 | 5/2005 | Regan | |
| 6,910,628 B1 | 6/2005 | Sehr | |
| 6,915,265 B1 | 7/2005 | Johnson | |
| 6,915,271 B1 | 7/2005 | Meyer et al. | |
| 6,947,908 B1 | 9/2005 | Slater | |
| 6,965,831 B2 | 11/2005 | Domany et al. | |
| 6,971,026 B1 | 11/2005 | Fujiyama et al. | |
| 6,983,266 B1 | 1/2006 | Goldschmidt | |
| 6,985,886 B1 | 1/2006 | Broadbent et al. | |
| 7,003,661 B2 | 2/2006 | Beattie et al. | |
| 7,006,992 B1 * | 2/2006 | Packwood | 705/38 |
| 7,024,383 B1 | 4/2006 | Mancini et al. | |
| 7,069,234 B1 | 6/2006 | Cornelius et al. | |
| 7,089,208 B1 | 8/2006 | Levchin et al. | |
| 7,114,177 B2 | 9/2006 | Rosenberg et al. | |
| 7,120,929 B2 | 10/2006 | Beattie et al. | |
| 7,124,101 B1 | 10/2006 | Mikurak | |
| 7,133,846 B1 | 11/2006 | Ginter et al. | |
| 7,161,465 B2 | 1/2007 | Wood et al. | |
| 7,167,844 B1 | 1/2007 | Leong et al. | |
| 7,181,428 B2 * | 2/2007 | Lawrence | 705/38 |
| 7,209,889 B1 | 4/2007 | Whitfield | |
| 7,231,353 B1 | 6/2007 | Goyal | |
| 7,231,395 B2 | 6/2007 | Fain et al. | |
| 7,389,265 B2 | 6/2008 | Lawrence et al. | |
| 7,403,922 B1 | 7/2008 | Lewis et al. | |
| 7,415,607 B2 | 8/2008 | Sinn | |
| 7,426,492 B2 | 9/2008 | van Soestbergen et al. | |
| 7,426,492 B1 * | 9/2008 | Bishop et al. | 705/39 |
| 7,428,756 B2 | 9/2008 | Wookey | |
| 7,437,310 B1 | 10/2008 | Dutta | |
| 7,451,114 B1 * | 11/2008 | Matsuda et al. | 705/39 |
| 7,461,250 B1 | 12/2008 | Duane et al. | |
| 7,506,158 B2 | 3/2009 | Fox et al. | |
| 7,523,054 B2 | 4/2009 | Tyson-Quah | |
| 7,552,466 B2 | 6/2009 | Rosenberg et al. | |
| 7,562,212 B2 | 7/2009 | Beattie et al. | |
| 7,593,892 B2 | 9/2009 | Balk et al. | |
| 7,620,556 B1 | 11/2009 | Ross | |
| 7,650,496 B2 | 1/2010 | Thornton et al. | |
| 7,653,810 B2 | 1/2010 | Thornton et al. | |
| 7,657,482 B1 | 2/2010 | Shirey et al. | |
| 7,694,135 B2 | 4/2010 | Rowan et al. | |
| 7,698,549 B2 | 4/2010 | Thornton et al. | |
| 7,698,557 B2 | 4/2010 | Saarepera et al. | |
| 7,708,200 B2 | 5/2010 | Helsper et al. | |
| 7,711,950 B2 | 5/2010 | Orbke et al. | |
| 7,752,154 B2 | 7/2010 | Friedlander et al. | |
| 7,813,944 B1 | 10/2010 | Luk et al. | |
| 7,904,361 B2 * | 3/2011 | Lawrence | 705/35 |
| 7,930,228 B1 * | 4/2011 | Hawkins et al. | 705/35 |
| 2001/0001014 A1 | 5/2001 | Akins et al. | |
| 2001/0011243 A1 | 8/2001 | Dembo et al. | |
| 2001/0016833 A1 | 8/2001 | Everling et al. | |

| | | | |
|---|---|---|---|
| 2001/0018674 A1 | 8/2001 | Schein et al. | |
| 2001/0027388 A1 | 10/2001 | Beverina et al. | |
| 2001/0027389 A1 | 10/2001 | Beverina et al. | |
| 2001/0029493 A1 | 10/2001 | Pare et al. | |
| 2001/0037275 A1 | 11/2001 | Johnson et al. | |
| 2001/0037318 A1 | 11/2001 | Lindskog et al. | |
| 2001/0044768 A1 | 11/2001 | Wares | |
| 2001/0047279 A1 | 11/2001 | Gargone | |
| 2001/0047347 A1 | 11/2001 | Perell et al. | |
| 2001/0049651 A1 | 12/2001 | Selleck | |
| 2001/0049793 A1* | 12/2001 | Sugimoto | 713/200 |
| 2001/0054020 A1 | 12/2001 | Barth et al. | |
| 2001/0056359 A1 | 12/2001 | Abreu | |
| 2002/0016854 A1 | 2/2002 | Hirasawa et al. | |
| 2002/0019804 A1 | 2/2002 | Sutton | |
| 2002/0029249 A1 | 3/2002 | Campbell et al. | |
| 2002/0032626 A1 | 3/2002 | DeWolf et al. | |
| 2002/0032635 A1 | 3/2002 | Harris et al. | |
| 2002/0032646 A1 | 3/2002 | Sweeney et al. | 705/38 |
| 2002/0032665 A1 | 3/2002 | Creighton et al. | |
| 2002/0035520 A1 | 3/2002 | Weiss | |
| 2002/0035543 A1 | 3/2002 | Shedd et al. | |
| 2002/0035685 A1 | 3/2002 | Ono et al. | |
| 2002/0046053 A1 | 4/2002 | Hare et al. | |
| 2002/0059093 A1 | 5/2002 | Barton et al. | |
| 2002/0062438 A1* | 5/2002 | Asay et al. | 713/157 |
| 2002/0069084 A1 | 6/2002 | Donovan | |
| 2002/0087454 A1* | 7/2002 | Calo et al. | 705/37 |
| 2002/0087455 A1* | 7/2002 | Tsagarakis et al. | 705/37 |
| 2002/0091622 A1 | 7/2002 | Mastwyk et al. | |
| 2002/0091635 A1 | 7/2002 | Dilip et al. | 705/39 |
| 2002/0091706 A1 | 7/2002 | Anderson et al. | |
| 2002/0099640 A1 | 7/2002 | Lange | |
| 2002/0099649 A1 | 7/2002 | Lee et al. | |
| 2002/0099651 A1 | 7/2002 | May | |
| 2002/0103744 A1 | 8/2002 | Llewelyn | |
| 2002/0103747 A1* | 8/2002 | Lawrence | 705/38 |
| 2002/0103852 A1 | 8/2002 | Pushka | |
| 2002/0107767 A1 | 8/2002 | McClair et al. | |
| 2002/0111890 A1 | 8/2002 | Sloan et al. | |
| 2002/0120477 A1 | 8/2002 | Jinnett | |
| 2002/0120582 A1 | 8/2002 | Elston et al. | |
| 2002/0128939 A1 | 9/2002 | Tarrant | |
| 2002/0128945 A1 | 9/2002 | Moss et al. | |
| 2002/0128952 A1 | 9/2002 | Melkomian et al. | |
| 2002/0128964 A1 | 9/2002 | Baker et al. | |
| 2002/0129255 A1 | 9/2002 | Tsuchiyama et al. | |
| 2002/0133442 A1 | 9/2002 | Laycock | |
| 2002/0138371 A1* | 9/2002 | Lawrence et al. | 705/27 |
| 2002/0138407 A1 | 9/2002 | Lawrence et al. | |
| 2002/0138408 A1 | 9/2002 | Lawrence | |
| 2002/0138417 A1 | 9/2002 | Lawrence | |
| 2002/0139837 A1 | 10/2002 | Spitz et al. | |
| 2002/0143562 A1 | 10/2002 | Lawrence | |
| 2002/0143693 A1 | 10/2002 | Soestbergen et al. | |
| 2002/0152156 A1 | 10/2002 | Tyson-Quah | |
| 2002/0161707 A1 | 10/2002 | Cole et al. | |
| 2002/0184068 A1 | 12/2002 | Krishnan et al. | |
| 2002/0188861 A1* | 12/2002 | Townsend | 713/200 |
| 2002/0194014 A1 | 12/2002 | Starnes et al. | |
| 2002/0198827 A1 | 12/2002 | van Leeuwen | |
| 2003/0009418 A1 | 1/2003 | Green et al. | |
| 2003/0018483 A1 | 1/2003 | Pickover et al. | |
| 2003/0018522 A1 | 1/2003 | Denimarck et al. | |
| 2003/0023543 A1 | 1/2003 | Gunewardena et al. | |
| 2003/0050718 A1 | 3/2003 | Tracy et al. | |
| 2003/0065613 A1 | 4/2003 | Smith | |
| 2003/0065942 A1* | 4/2003 | Lineman et al. | 713/201 |
| 2003/0066872 A1 | 4/2003 | McClure et al. | |
| 2003/0069742 A1 | 4/2003 | Lawrence | |
| 2003/0069821 A1 | 4/2003 | Williams | |
| 2003/0069894 A1 | 4/2003 | Cotter et al. | |
| 2003/0073310 A1 | 4/2003 | Olgado et al. | |
| 2003/0074272 A1 | 4/2003 | Knegendorf et al. | |
| 2003/0138407 A1 | 7/2003 | Lu et al. | |
| 2003/0145124 A1 | 7/2003 | Guyan et al. | |
| 2003/0163398 A1* | 8/2003 | Yoshioka et al. | 705/35 |
| 2003/0167177 A1 | 9/2003 | Branch | |
| 2003/0167237 A1 | 9/2003 | Degen et al. | |
| 2003/0172017 A1 | 9/2003 | Feingold et al. | |
| 2003/0177087 A1* | 9/2003 | Lawrence | 705/38 |
| 2003/0187790 A1 | 10/2003 | Swift et al. | |
| 2003/0195843 A1 | 10/2003 | Matsuda et al. | |
| 2003/0233297 A1 | 12/2003 | Campbell | |
| 2004/0024693 A1* | 2/2004 | Lawrence | 705/38 |
| 2004/0039704 A1 | 2/2004 | Gilliam et al. | |
| 2004/0054563 A1 | 3/2004 | Douglas | |
| 2004/0111379 A1 | 6/2004 | Hicks et al. | |
| 2004/0193532 A1* | 9/2004 | Lawrence | 705/37 |
| 2004/0215557 A1* | 10/2004 | Michelsen | 705/39 |
| 2005/0080716 A1* | 4/2005 | Belyi et al. | 705/38 |
| 2005/0086090 A1* | 4/2005 | Abrahams et al. | 705/7 |
| 2005/0144114 A1* | 6/2005 | Ruggieri et al. | 705/37 |
| 2005/0187841 A1 | 8/2005 | Grear et al. | |
| 2006/0010063 A1 | 1/2006 | Drummond et al. | |
| 2006/0089894 A1 | 4/2006 | Balk et al. | |
| 2006/0116898 A1 | 6/2006 | Peterson | |
| 2006/0218651 A1 | 9/2006 | Ginter et al. | |
| 2007/0005496 A1 | 1/2007 | Cataline et al. | |
| 2007/0038544 A1 | 2/2007 | Snow et al. | |
| 2007/0061594 A1 | 3/2007 | Ginter et al. | |
| 2007/0219882 A1 | 9/2007 | May | |
| 2007/0288355 A1 | 12/2007 | Roland et al. | |
| 2008/0021835 A1 | 1/2008 | Ginter et al. | |
| 2008/0077530 A1 | 3/2008 | Banas et al. | |
| 2008/0319922 A1 | 12/2008 | Lawrence et al. | |
| 2008/0320092 A1 | 12/2008 | Campbell et al. | |
| 2009/0031127 A1 | 1/2009 | Campbell et al. | |
| 2009/0043687 A1 | 2/2009 | van Soestbergen et al. | |
| 2009/0132813 A1 | 5/2009 | Schibuk | |
| 2009/0187761 A1 | 7/2009 | Campbell et al. | |
| 2009/0299896 A1 | 12/2009 | Zhang et al. | |
| 2009/0319420 A1 | 12/2009 | Sanchez et al. | |
| 2010/0138262 A1 | 6/2010 | Lawrence | |
| 2010/0235300 A1 | 9/2010 | Feingold | |

FOREIGN PATENT DOCUMENTS

| | | |
|---|---|---|
| EP | 0999489 | 5/2000 |
| EP | 1 137 209 | 9/2001 |
| EP | 1 143 365 | 10/2001 |
| JP | 02000020618 A | 6/1998 |
| JP | 0200002061 | 1/2000 |
| JP | 020000020618 A | 1/2000 |
| JP | 0200350896 A | 8/2001 |
| JP | 0200305089 | 2/2003 |
| WO | WO 00/75836 A2 | 12/2000 |
| WO | WO 01/55885 A2 | 8/2001 |
| WO | 02075485 | 9/2002 |

OTHER PUBLICATIONS

Int'l Search Report dated Feb. 3, 2003 for PCT/US02/07110.
Co-Pending U.S. Appl. No. 09/772,427, Applicant Lawrence, filed Jan. 30, 2001.
Co-Pending U.S. Appl. No. 09/812,628, Applicant Lawrence, filed Mar. 20, 2001.
Co-Pending U.S. Appl. No. 09/825,470, Applicant Lawrence, filed Apr. 2, 2001.
Co-Pending U.S. Appl. No. 09/919,413, Applicant Lawrence, filed Jul. 31, 2001.
Co-Pending U.S. Appl. No. 09/974,212, Applicant Lawrence, filed Oct. 9, 2001.
Banasiak, Michael "Don't Be Out-Scored by Your Competition", *Credit and Financial Management Review*, 2<sup>nd</sup> Quarter 2000, 8pgs., download from http://www.paynetonline.com/viewpaf.asp on Apr. 15, 2002. ©2000 Predictive Business Decision Systems, Inc.
Co-Pending U.S. Appl. No. 09/772,427, Applicant Lawrence, filed Jan. 30, 2001.
"PCT Notification of Transmittal of the International Search Report", mailed Jul. 6, 2005, for PCT/US04/03766.
"Commentary: Foreign Assets Control Regulations: The Countries Aren't Enough", Letter of Credit Update, Mar. 1996, pp. 23-27.
"Enterprise Anti-Money Laundering Product Specification." Mantas, 2001.
"Firms Consider Pact to Track Terror Money." Wall Street Journal, Nov. 26, 2001. cited by other.

"Five Ways to Reduce Risk with Neutral Networks." Credit Risk Management Report, vol. 3, Jun. 27, 1993.

"OFAC Compliance: A Perspective for Community Banks", ABA Bank Compliance Nov./Dec. 1998, pp. 39-48.

"Specially designated Who? A Primer on OFAC Compliance" ABA Bank Compliance Mar/Apr. 1996, pp. 29-36.

"Transforming Discovery Into Opportunity"; "Key Personnel Bios"; "Frequenty Asked Questions", Mantas. Mantas, Inc., Announces Funding and Management Team:, Mantas, Jun. 4, 2001. "Safeguard and SRA Partner to Launch Mantas, Inc.", Mantas., "Knowledge Discovery Platform"; "Money Laundering Detection for Banks"; "Fraud and Money Laundering Detection for Securities Firms"; "Best Exuecution", "Equities Trading Compliance", Mantas.

Aguais, Scott D. "It's the Economy." Credit Card Management, vol. 5, 1993, pp. 58-60.

Anonymous. "Information available at the web site of insuremarket". Feb. 20, 1999. 6 pages.

Anonymous. InsureZone's AgentSecure Expands by Adding Life and Disability Insurance to its Existing Commercial P&C Product Set. PR Newswire. No. 11920919. May 13, 2002. Page 1.

Anthony Mills article "A systematic approach to risk management for construction" Structural Survey, vol. 19, No. 5, p. 245, 2001.

Axciom®, PerformanceData to Link List Databases; AGreement Provides Credit Data, Real Property/Demographic Data, PR Newswire, Jul. 27, 1999, 3 pages.

Barrett, Jennifer, "Banking on Software Solutions", Newsweek Web, Jun. 12, 2002.

Business Editors, Tarrant Apparel Group Announces Exercise of LDA Option Limit Now Holds 7.3% Interest in Tarrant, Oct. 22, 1998, Business Wire, p. 1-3.

Carreker-Antinori Forms Risk Management Unit: New Service Helps Banks Identify, Reduce Operations Risk, Nov. 17, 1997, http://www.carreker.com/main/media/press_releases/releases1997/11-17-97.htm, 2 pages.

Casino Gambling in New Jersey—A Report to the National Gambling Impact Study Commission, New Jersey Casino Control Commission, Jan. 1998 (57 pages).

Caudill, Maureen et al., "Naturally Intelligent Systems." The MIT Press, 1990.

Cetron, Martin; Keystone, Jay; Shlim, David; Steffen, Robert. "Travelers' Health". Jul.-Sep. 1998. Emerging Infectious Diseases. vol. 4, Issue 3.

Chandler, Gary "Credit Scoring; A Feasibility Study." Executive, 1985.

Dave Berns's article, Resort Owners Seek Loans, Los Vegas Review Journal, Nov. 16, 1999, p. 1.D.

Dirty Dollars Elude Authorities; Geiger, Keri, LatinFinance. Issue 140, found on http://proquest.umi.com , p. 1-3.

EPA Asbestos Ban: Calrification May 18, 1999, retrieved from http://www.epa.gov/asbestos/pubs/asbbans2.pdf, May 29, 2008.

EPA Asbestos Ban: Clarification May 18, 1999, retrieved from http://lxww.epa.Fov/asbestos/nubsiasbbans2.pdf, May 29, 2008.

Everest-Hill, Deborah "Automating Risk Assessment." The Internal Auditor, vol. 56, Jun. 1999, pp. 23-25.

FTC Settles with Debt Collection Agency, Credit Risk Management Reporter, Sep. 5, 2000, vol. 10, Iss 17, p. 1 op.

George Weir, Can Fiduciaries Avoid Liability Under Environmental Law?, Estate Planning, Jul./Aug. 1992, vol. 19, pp. 1-2.

Grafton, David. "Analysing Customers With Behavioural Modelling," Credit Control, vol. 17,1996, pp. 27-31.

Gramm-Leach-Bliley Act enacted Nov. 12, 1999 Exceptions to Notice and Opt-Out Requirements: Section 313.15.

Gullo, Karen "Neutral Nets Versus Card Fraud; Chase's Software Learns to Detect Potential Crime." The American Banker, Feb. 2, 1990.

Healy, Thomas J. "The New Science of Borrower Behavior," Factiva, Feb. 1, 1998.

Hicks M., "What, me spam?" Good intentions alone aren't enough to avoid alienating customers, eWeek Sep. 3, 2001, retrieved from Dialog Dialog No. 08984028, see abstract.

Higgins, Kevin T. "Retention by the Numbers," Credit Card Management, vol. 5, 1993, pp. 52-S6.

International Health Regulations 1983. World Health Organization. Third Annotated Edition.

International Preliminary Examination Report dated Jun. 15, 2004 for PCT/US02/39260.

International Preliminary Examination Report dated Mar. 16, 2005 for PCT/US03/17935.

International Preliminary Examination Report from PCT/US03/19242 dated Mar. 31, 2005.

International Search Report dated Jun. 19, 2003 for PCT/US03/07337.

International Search Report dated Jun. 24, 2004 for PCT/US03/018273.

International Search Report dated Jun. 2, 2003 for PCT/US03/03993.

International Search Report dated May 30, 2003 for PCT/US02/24123.

International Search Report dated Oct. 1, 2003 for PCT/US03/03994.

International Search Report dated Oct. 7, 2003 for PCT/US03/17935.

International Search Report from PCT/US02/39260 dated Sep. 9, 2003.

International Search Report from PCT/US03/13169 dated Dec. 2, 2003.

International Search Report from PCT/US03/18273 dated Jun. 24, 2004.

International Search Report from PCT/US03/18430 dated Dec. 22, 2003.

International Search Report from PCT/US03/19198 dated Dec. 23, 2003.

International Search Report from PCT/US03/19219 dated Dec. 15, 2003.

International Search Report from PCT/US03/19242 dated Dec. 3, 2003.

International Search Report from PCT/US03/19376 dated Dec. 4, 2003.

International Search Report from PCT/US03/23033 dated Apr. 9, 2004.

International Search Report from PCT/US03/23310 dated Jun. 18, 2004.

Leonard, Kevin J. and William J. Banks. "Automating the Credit Decision Process." Journal of Retail Banking, vol. 16, 1994, p. 39.

Marc Schniederjans, Strategic Acquisition Management: A Multi-Objective Synergistic Approach, The Journal of the Operational Research Society, vol. 40, No. 4 Apr. 1989 (pp. 333-345).

McLure, Leslie "Taking the Risk Out of Transactions," Factiva, Mar, 1, 1994.

Power, Stephen "Background Checks Await Fliers." The Wall Street Journal, Jun. 7, 2002.

Preparation Guidelines for Suspicious Activity Report Form (SAR) and the SAR PC Software User Guide of the Internal Revenue Service, found on www.archive.org of Jun. 3, 2000 (p. i-61).

Proprietary Right, Collins Dictionary of Law. London, WJ Stewart 2006.

Purcell, Lea "Roping in Risk," Factiva, May 1, 1994.

Quinn, Jane Bryant "Credit Card Issuers; Keeping a Closer Watch on How You Pay Bills." Washington Post, Apr. 25, 1988.

Ralph Vartabedian, US Mounts High-Stakes Computer Reform Effort; Technology: The aim is to reverse decades of failing performance. Experts are encouraged at changes' breadth. Series: Fedearl Computers: Is System Haywire? Last of Three Parts, Los Angeles Times Dec. 10, 1996, 2 pages.

Regulatory Risks, Detroit News, Sep. 20, 1999, 2 pages.

Retailing: Casino, Cora Create Joint Buying Venture, The Wall Street Journal, Apr. 20, 1999, p. 1.

Richard N. Clarke's article SICs as a Definition of Economic Markets, published in the Journal of Business, vol. 62, No. 1, Jan. 1989, p. 17-31.

Sinkey,J.F. Commercial Bank Financial Management in the financial Services Industry 4th Edition McMillian Publishing Co New York, 1992 p. 156.

The Federal Trade Commission's article Fair Credit Reporting, Mar. 1999, retrieved from http://www.pueblo.gsa.gov/cic.sub.--text/money/fair-credit/fair-crd.htm, May 29, 2008.

Tony Batt, Indians protest proposed changes in gaming regulations, Las Vegas Review Apr. 27, 1994, 1 page.

Toshio Airtake, Japanese Government Panel recommends new laws to protect personal information, BNA's Banking Report, Dec. 6, 1999, p. 1.
U.S. General Services Administration. 41 Code of Federal Regulations, Chapters 300-304. Jul. 1, 1997 Edition. pp. 10-18 retrieved from <http://www.gsa.gov/federaltravelregulation >.
Written Opinion dated Oct. 7, 2003 for PCT/US03/03993.
Written Opinion from PCT/US03/19198 dated Jul. 6, 2004.
Written Opinion from PCT/US03/19242 dated Jun. 21, 2004.
"PCT Notification of Transmittal of the International Search Report", mailed Jul. 6, 2005, for PCT/US04/03766.
"Commentary: Foreign Assets Control Regulations; The Countries Aren't Enough", Letter of Credit Update, Mar, 1996, pp. 23-27.
"Enterprise Anti-Money Laundering Product Specification," Mantas, 2001.
"Firms Consider Pact to Track Terror Money." Wall Street Journal, Nov. 26, 2001.
"Five Ways to Reduce Risk with Neutral Networks." Credit Risk Management Report, vol. 3, Jun. 27, 1993.
"OFAC Compliance: A Perspective for Community Banks", ABA Bank Compliance Nov./Dec. 1998, pp. 39-48.
"Specially designated Who? A Primer on OFAC Compliance" ACA Bank Compliance Mar./Apr. 1996, pp. 29-36.
"Transforming Discovery Into Opportunity"; "Key Personnel Bios"; "Frequently Asked Questions"; Mantas. Mantas, Inc., Announces Funding and Management Team:, Mantas, Jun. 4, 2001. "Safeguard and SRA Partner to Launch Mantas, Inc.", Mantas., "Knowledge Discovery Platform"; "Money Laundering Detection for Banks"; "Fraud and Money Laundering Detection for Securities Firms"; "Best Execution"; "Equities Trading Compliance", Mantas.
Aguais Scott D. "It's the Economy," Credit Card Management, vol. 5, 1993, pp. 58-60.
Anonymous. "Information available at the web site of insuremarket". Feb. 20, 1999. 6 pages.
Anonymous. InsureZone's AgentSecure Expands by Adding Life and Disability Insurance to its Existing Commercial P&C Product Set. PR Newswire. No. 11920919. May 13, 2002. Page 1.
Anthony Mills article "A systematic approach to risk management for construction", Structural Survey, vol. 19, No. 5, p. 245, 2001.
Axciom®, PerformanceData to Link List Databases; Agreement Provides Credit Data, Real Property/Demographic Data, PR Newswire, Jul. 27, 1999, 3 pages.
Barrett, Jennifer, "Banking on Software Solutions", Newsweek Web, Jun. 12, 2002.
Business Editors, Tarrant Apparel Group Announces Exercise of LDA Option Limit Now Holds 7.3% Interest in Tarrant, Oct. 22, 1998, Business Wire, p. 1-3.
Capitol Briefs, Arizona Daily Star, Feb. 5, 1997, p. 3.B.
Carreker-Antinori Forms Risk Management Unit: New Service Helps Banks Identify, Reduce Operations Risk, Nov. 17, 1997, http://www.carreker.com/main/media/press_releases/releases1997/11-17-97.htm, 2 pages.
Casino Gambling in New Jersey —A Report to the National Gambling Impact Study Commission, New Jersey Casino Control Commission, Jan. 1998 (57 pages).
Caudill, Maureen et al., "Naturally Intelligent Systems." The MIT Press, 1990.
Cetron, Martin; Keystone, Jay; Shlim, David; Steffen, Robert. "Travelers' Health". Jul.-Sep. 1998. Emerging Infectious Diseases. vol. 4, Issue 3.
Chandler, Gary "Credit Scoring; A Feasibility Study," Executive, 1985.
Dave Berns's article, Resort Owners Seek Loans, Los Vegas Review Journal, Nov. 16, 1999, p. 1.D.
Dirty Dollars Elude Authorities; Geiger, Keri, LatinFinance. Issue 140, found on http://proquest.umi.com , p. 1-3.
EPA Asbestos Ban: Clarification May 18, 1999, retrieved from http://www.epa.gov/asbestos/pubs/asbbans2.pdf, May 29, 2008.
Everest-Hill Deborah "Automating Risk Assessment." The Internal Auditor, vol. 56; Jun. 1999, pp. 23-25.
FTC Settles with Debt Collection Agency, Credit Risk Management Reporter, Sep. 5, 2000, vol. 10, Iss 17, pg. 1 op.

George Weir, Can Fiduciaries Avoid Liability Under Environmental Law?, Estate Planning, Jul./Aug. 1992, vol. 19, pp. 1-2.
Grafton, David. "Analyzing Customers With Behavioral Modeling," Credit Control, vol. 17, 1996, pp. 27-31.
Gramm-Leach-Bliley Act enacted Nov. 12, 1999 Exceptions to Notice and Opt-Out Requirements: Section 313.15.
Gullo, Karen "Neutral Nets Versus Card Fraud; Chase's Software Learns to Detect Potential Crime." The American Banker, Feb. 2, 1990.
Healy, Thomas J. "The New Science of Borrower Behavior," Factiva, Feb. 1, 1998.
Hicks M., "What, me spam?" Good intentions alone aren't enough to avoid alienating customers, eWeek Sep. 3, 2001, retrieved from Dialog Dialog No. 03984028, see abstract.
Higgins, Kevin T. "Retention by the Numbers." Credit Card Management, vol. S, 1993, pp. 52-S6.
International Health Regulations 1983. World Health Organization. Third Annotated Edition.
International Preliminary Examination Report dated Jun. 15, 2004 for PCT/US02/39260.
International Preliminary Examination Report dated Mar. 16, 2005 for PCT/US03/17935.
International Preliminary Examination Report dated Oct. 9, 2004 for PCT/US02/07110.
International Preliminary Examination Report dated Sep. 29, 2003 for PCT/US03/23033.
International Preliminary Examination Report from PCT/US03/19242 dated Mar. 31, 2005.
International Search Report dated Feb. 3, 2003 for PCT/US02/07110.
Leonard, Kevin J. and William J. Banks. "Automating the Credit Decision Process," Journal of Retail Banking, vol. 16,1994, p. 39.
Marc Schniederjans, Strategic Acquisition Management: A Multi-Objective Synergistic Approach, The Journal of the Operational Research Society, vol. 40, No. 4 Apr. 1989 (pp. 333-345).
McLure, Leslie "Taking the Risk Out of Transactions." Factiva, Mar. 1, 1994.
Power, Stephen "Background Checks Await Fliers," The Wall Street Journal, Jun. 7, 2002.
Preparation Guidelines for Suspicious Activity Report Form (SAR), found on www.archive.org of Jun. 3, 2000.
Quinn, Jane Bryant "Credit Card Issuers; Keeping a Closer Watch on How You Pay Bills." Washington Post, Apr. 25, 1988.
Ralph Vartabedian, US Mounts High-Stakes Computer Reform Effort; Technology: The aim is to reverse decades of failing performance. Experts are encouraged at changes' breadth. Series: Fedearl Computers: Is System Haywire? Last of Three Parts, Los Angeles Times Dec. 10, 1996, 2 pages.
Retailing: Casino, Cora Create Joint Buying Venture, The Wall Street Journal, Apr. 20, 1999, p. 1.
Richard N. Clarke's article SICs as a Definition of Economic Markets, published in the Journal of Business, vol. 62, No. 1, Jan. 1989, p. 17-31.
SAR PC Software User Guide of the Internal Revenue Service, found on www.archive.org of Jun. 3, 2000 (p. i -61).
Sinkey,J.F. Commercial Bank Financial Management in the financial Services Industry 4th Edition McMillian Publishing Co New York, 1992 p. 156.
The Federal Trade Commission's article Fair Credit Reporting, Mar. 1999, retrieved from http://www.pueblo.gsa.gov/cic.sub.--text/money/fair-credit/fair-crd.htm, May 29, 2008.
Tony Batt, Indians protest proposed changes in gaming regulations, Las Vegas Review Apr. 27, 1994, 1 page.
Toshio Airtake, Japanese Government Panel recommends new laws to protect personal information, BNA's Banking Report, Dec. 6, 1999, p. 1.
U.S. General Services Administration. 41 Code of Federal Regulations, Chapters 300-304. Jul. 1, 1997 Edition. pp. 10-18 retrieved from <http://www.gsa.gov/federaltravelregulation >.
World-Check Search—Vladimir Gusinsky (Russia).

* cited by examiner

Fig. 6

AUTOMATED GLOBAL RISK MANAGEMENT

BACKGROUND

This invention relates generally to a method and system for facilitating the identification, investigation, assessment and management of legal, regulatory financial and reputational risks ("risks"). In particular, the present invention relates to a computerized system and method for banks and non-bank financial institutions to access information compiled on a worldwide basis, wherein the information is conducive to quantifying and managing financial, legal, regulatory and reputational risk.

Bank and non-bank financial institutions, including: investment banks; merchant banks; commercial banks; securities firms, including broker dealers securities and commodities trading firms; asset management companies, hedge funds, mutual funds, credit rating funds, securities exchanges and bourses, institutional and individual investors, law firms, accounting firms, auditing firms and other entities, hereinafter collectively referred to as "financial institutions," typically have few resources available to them to assist in the identification of present or potential risks associated with business transactions. Risk can be multifaceted and far reaching. Generally, personnel do not have available a mechanism to provide real time assistance to assess a risk factor or otherwise qualitatively manage risk. In the event of problems, it is often difficult to quantify to regulatory bodies, shareholders, newspapers and other interested parties, the diligence exercised by the financial institution to properly identify and respond to risk factors. Absent a means to quantify good business practices and diligent efforts to contain risk, a financial institution may appear to be negligent in some respect.

Risk associated with maintaining an investment account can include factors associated with financial risk, legal risk, regulatory risk and reputational risk. Financial risk includes factors indicative of monetary costs that the financial institution may be exposed to as a result of opening a particular account and/or transacting business with a particular client. Monetary costs can be related to fines, forfeitures, costs to defend an adverse position, or other related potential sources of expense. Regulatory risk includes factors that may cause the financial institution to be in violation of rules put forth by a regulatory agency such as the Securities and Exchange Commission (SEC). Reputational risk relates to harm that a financial institution may suffer regarding its professional standing in the industry. A financial institution can suffer from being associated with a situation that may be interpreted as contrary to an image of honesty and forthrightness.

Risk associated with an account involved in international transactions can be greatly increased due to the difficulty in gathering and accessing pertinent data on a basis timely to managing risk associated with the transaction. As part of due diligence associated with managing financial accounts, it is imperative for a financial institution to "Know Their Customer" including whether a customer is contained on a list of restricted entities published by the Office of Foreign Access Control (OFAC), the Treasury Office or other government or industry organization.

Compliance officers and other financial institution personnel typically have few resources available to assist them with the identification of present or potential global risks associated with a particular investment or trading account. Risks can be multifaceted and far reaching. The amount of information that needs to be considered to evaluate whether an international entity poses a significant risk or should otherwise be restricted, is substantial.

However, financial institutions do not have available a mechanism which can provide real time assistance to assess a risk factor associated with an international entity, or otherwise qualitatively manage such risk. In the event of investment problems, it is often difficult to quantify to regulatory bodies, shareholders, newspapers and/or other interested parties, the diligence exercised by the financial institution to properly identify and respond to risk factors. Absent a means to quantify good business practices and diligent efforts to contain risk, a financial institution may appear to be negligent in some respect.

What is needed is a method and system to draw upon information gathered globally and utilize the information to assist with risk management and due diligence related to financial accounts. A new method and system should anticipate offering guidance to personnel who interact with clients and help the personnel identify high risk situations. In addition, it should be situated to convey risk information to a compliance department and be able to demonstrate to regulators that a financial institution has met standards relating to risk containment.

SUMMARY

Accordingly, the present invention provides a risk management method and system for facilitating analysis and quantification of risk associated with a financial transaction. An automated global risk management system maintains a database relating risk variables including world events government advisories, and other information sources with potential risk for a financial institution. A rating system is used to assess risk based upon criteria such as risk advisories, historical data and/or interpretation of world events. The system can generate a risk quotient or other rating based upon a weighted algorithm applied to the criteria, wherein the risk quotient is indicative of risk associated with a transaction or an account. The quotient can be monitored on a periodic basis, during the course of a transaction, upon account opening or on demand. Actions commensurate with a risk quotient can be presented to a financial institution to help the institution properly manage risk associated with a particular entity or transaction.

A log or other stored history can be created such that utilization of the system can mitigate adverse effects relating to a problematic account. Mitigation can be accomplished by demonstrating to regulatory bodies, shareholders, news media and other interested parties that corporate governance is being addressed through tangible risk management processes. In summary fashion, the present invention includes a method and system for identifying risks associated with the domestic and global commercial activities of financial firms including, for example, a transactions involving: financial institution, an insurance company, a credit card issuer, a trading exchange, a government regulator, a law enforcement agency, an investment and merchant bank, public and private financing, commodities and securities trading, commercial and consumer lending, asset management, the ratings of corporations and securities, public and private equity investments, public and private fixed income investments, the listing of companies on securities exchanges and bourses, employee screening and hereinafter collectively referred to as "Financial Transactions."

In another aspect, a computer system for providing risk management relating to opening accounts can include a computer server that is accessible with a network access device via a communications network and executable software stored on the server which is executable on demand via the network access device. The software can be operative with the server to gather or receive information relating to risk factors and formulate a risk quotient or other rating. In addition, where applicable, risk can be aggregated, such as by rating, and transferred.

The present invention includes a computer-implemented method for managing risk related to financial transactions involving international or global exposure. The method includes receiving information relating to an entity involved in a financial transaction and structuring the information received according to risk quotient criteria. A risk quotient is calculated using the structured information. A suggested action responsive to the risk quotient or the information received can also be generated.

Typically the suggested actions will be directed towards reducing risk relating to an account associated with international exposure, although actions can be directed towards law enforcement or other directives also. In one embodiment, the action can include refusing to open an account or perform a transaction. Another action may involve notifying an authority, such as the police.

In another aspect, the information received can be stored, as can the risk quotient and the suggested action, and utilized to generate a diligence report. The diligence report can include information received relating to an account and actions taken responsive to the risk quotient.

Still another aspect can include aggregating risk quotients relating to a financial institution to assess a level of identified risk to which the financial institution is exposed. An average risk quotient associated with a transaction can also be calculated.

Other embodiments include a computerized system for managing risk associated with a financial account, computer executable program code residing on a computer-readable medium, a computer data signal embodied in a digital data stream, or a method of interacting with a network access device. Various features and embodiments are further described in the following figures, drawings and claims.

DETAILED DESCRIPTION

The present invention includes a computerized method and system for managing risk associated with financial transactions with international exposure. A computerized system gathers and stores information in a database or other data storing structure and relates the information to risk factors pertaining to financial accounts. A rating system is used to assess risk based upon the information received and the risk factors. A rating, such as a risk quotient can be generated too readily indicate a level of risk associated with a particular account or account holding entity. The risk quotient can be based upon a weighted algorithm applied to the risk factors. The risk quotient can be made available on a periodic basis, on demand in real time, in response to an event such as an account opening, or according to some other request. Actions commensurate with a risk level can be presented to assist with proper risk management.

Figure 1:
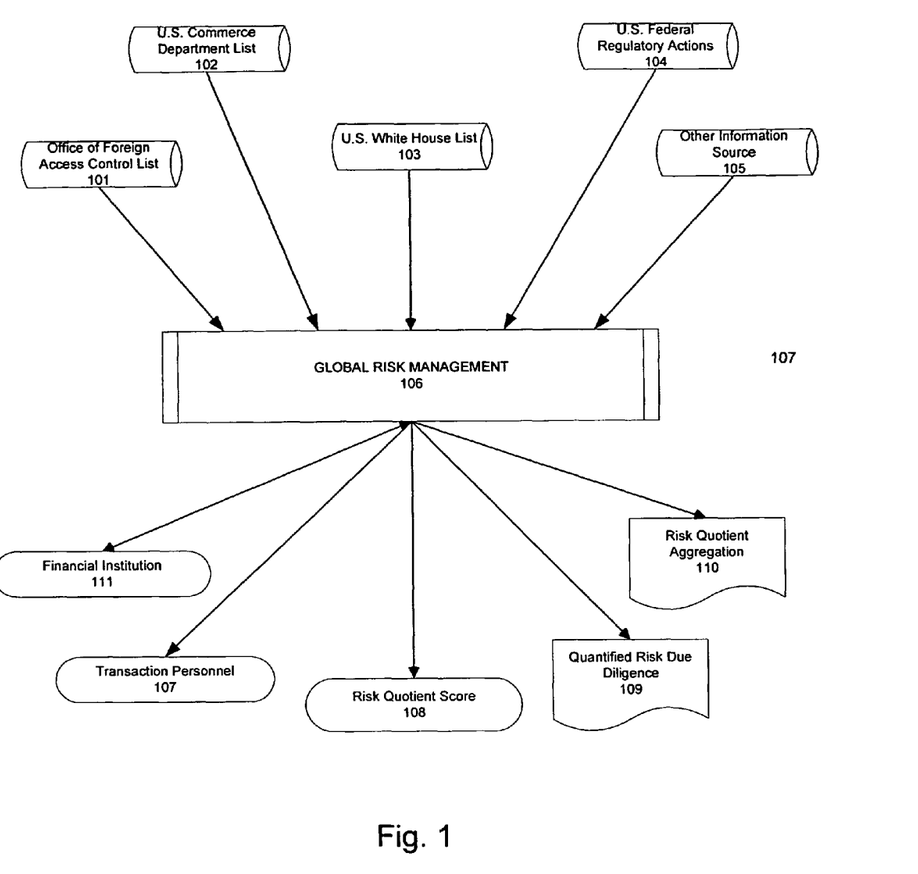
FIG. 1 illustrates a block diagram that can embody this invention.

Referring now to FIG. 1 a block diagram of one embodiment of the present invention is illustrated. A Global Risk Management (GRM) system 106, receives information relating to entities that are restricted, controlled, or otherwise marked as high risk. The information can be received for example from a list generated by the Office of Foreign Assets Control (OFAC) 101 including their sanction and embargo list, a list generated by the U.S. Commerce Department 102, a list of international "kingpins" generated by the U.S. White House 103, U.S. regulatory actions 104 or other information source 105 such as a foreign government, U.S. adverse business-related media reports, U.S. state regulatory enforcement actions, International regulatory enforcement actions, International adverse business-related media reports, a list of politically connected individuals and military leaders, list of U.S. and international organized crime members and affiliates or a list of recognized high risk countries. Other information received may indicate that an entity is not high risk. For example an entity may be a corporation from a G-7 country that is traded on a major exchange.

Information can also be input by a financial institution. For example, in the course of dealings with a particular entity, a financial institution may discover or suspect that the entity is involved in some fraudulent or otherwise illegal activity and report this information to the GRM system 106.

A decision by a financial institution concerning whether to pursue a financial transaction can be dependent upon many factors. A multitude and diversity of risks related to the factors may need to be identified and evaluated. In addition, the weight and commercial implications of the factors and associated risks can be interrelated. The present invention can provide a consistent and uniform method for business, legal, compliance, credit and other personnel of financial institutions to identify and assess risks associated with a transaction. A GRM system 106 allows investment activity risks to be identified, correlated and quantified by financial institutions thereby assessing legal, regulatory, financial and reputational exposure.

Financial institutions are often closely regulated. As a result financial institutions are exposed to significant risks from their obligations of compliance with the law and to prevent, detect and, at times, report potential violations of laws, regulations and industry rules ("laws"). These risks include, but are not limited to, the duty to disclose material information, and to prevent and possibly report: fraud, money laundering, foreign corrupt practices, bribery, embargoes and sanctions. Through a series of structured questions and weighting of information received as answers, financial institutions can structure a risk exposure and receive suggested responses to a specific risk scenario.

A financial institution can integrate a GRM system 106 as part of legal and regulatory oversight for various due diligence and "know your customer" obligations imposed by regulatory authorities. The GRM system 106 can facilitate detection and reporting of potential violations of law as well as address the "suitability" of a financial transaction and/or the assessment of sophistication of a customer. Similarly, the GRM system 106 can support a financial institution's effort to meet requirements regarding the maintenance of accurate books and records relating to their financial transactions and affirmative duty to disclose material issues affecting an investor's decisions.

An institution that may implement, or make use of the present invention can include an investment bank, a merchant bank, a commercial bank, a security firm, an asset management company, a hedge fund, a mutual find, a credit rating agency, a security exchange and bourse, an institutional or individual investor, an auditing firm, a law firm, or other institution who may be involved with financial transactions. Similarly, financial investments can include investment and merchant banking, public and private financing, commodities and a securities trading, commercial and consumer lending, asset management, rating of corporations and securities, public and private equity investment, public and private fixed income investment, listing to companies on a securities exchange and bourse, employee screening, auditing of corporate or other entities, legal opinions relating to a corporate or other entity, or other business related transactions.

A log or other stored history can be created such that utilization of the system can mitigate adverse effects relating to a problematic account. Mitigation can be accomplished by demonstrating to regulatory bodies, shareholders, news media and other interested parties that corporate governance is being addressed through tangible risk management processes. An implementing institution may include, for example, a bank, a trading institution, an insurance company, a credit card issuer, a trading exchange, a government regulator or a law enforcement agency.

Information relating to financial, legal, regulatory and/or reputational risk is received into a computer system. The computer system applies an algorithm that weights the input information and calculates a risk quotient or similar score or rating. The risk quotient can include, for example, a scaled numeric or alpha-numeric value.

If an account reaches or exceeds a risk quotient threshold, the system responds with a predetermined action. Actions can include, for example, generating an alert, blocking acceptance of a transaction, creating a report, notifying a compliance department, or other appropriate response. In addition, the system can create a structured history relating to a new account that can demonstrate due diligence and proper corporate governance. Reporting can be generated from the structured history.

In the case of an automated account opening, such as, for example, opening an online account, questions can be presented to the account opener by a programmable robot via a GUI. Questions can relate to a particular type of account, a particular type of client, types of investment, or other criteria. Other prompts or questions can aid a financial institution ascertain the identity of an account holder and an account's beneficial owner. If there is information indicating that a proposed account is beneficially owned by a high risk entity, the financial institution may not wish to open an account if it is unable to determine the identity of the high risk entity and his or her relationship to the account holder.

The GRM system 106 can receive open queries containing information relating to an individual or circumstance associated with a financial transaction and/or provide questions, historical data, world event information and other targeted information to facilitate a determination regarding an at risk entity's source of wealth and of the particular funds involved with an account or transaction in consideration.

Questions or prompts proffered by the GRM system 106 can also depend from previous information received. Information generally received, or received in response to the questions, can be input into the GRM system 106 from which it can be utilized for real time GRM risk assessment and generation of a GRM risk quotient 108.

The GRM risk assessment and GRM risk quotient 108 can subsequently be made available by the GRM system 106 to a financial institution 111 or personnel interested in the transaction 107. In one embodiment, the GRM risk quotient can be made available in real time. A real time assessment can allow the GRM system 106 to provide a suggested action, which can be taken to address a particular risk quotient. The GRM system 106 can also take into consideration input information in order to generate a suggested action. A suggested action may include; for example, limiting the scope of a transaction entered into, discontinuing a transaction associated with high risk participants, notifying authorities, or other appropriate actions.

The GRM system 106 can quantify risk due diligence 109 by capturing and storing a record of information received and actions taken relating to a GRM account. Once quantified, the due diligence data can be utilized for presentation to regulatory bodies, shareholders, news media and/or other interested parties, to mitigate adverse effects relating to a problematic account. The data can demonstrate that corporate governance is being addressed through tangible risk management processes.

The GRM system 106 can also aggregate risk quotient scores 108 to assess a level of GRM risk being tolerated by the institution. Other calculations, such as, for example, the sum, mean, average, or other calculation can be made by the GRM system 106 to further analyze GRM risk at a financial institution. If desired, a rating can be applied to an institution according to the amount for GRM risk tolerated by the institution, such as, for example, the average risk tolerated.

Figure 2:
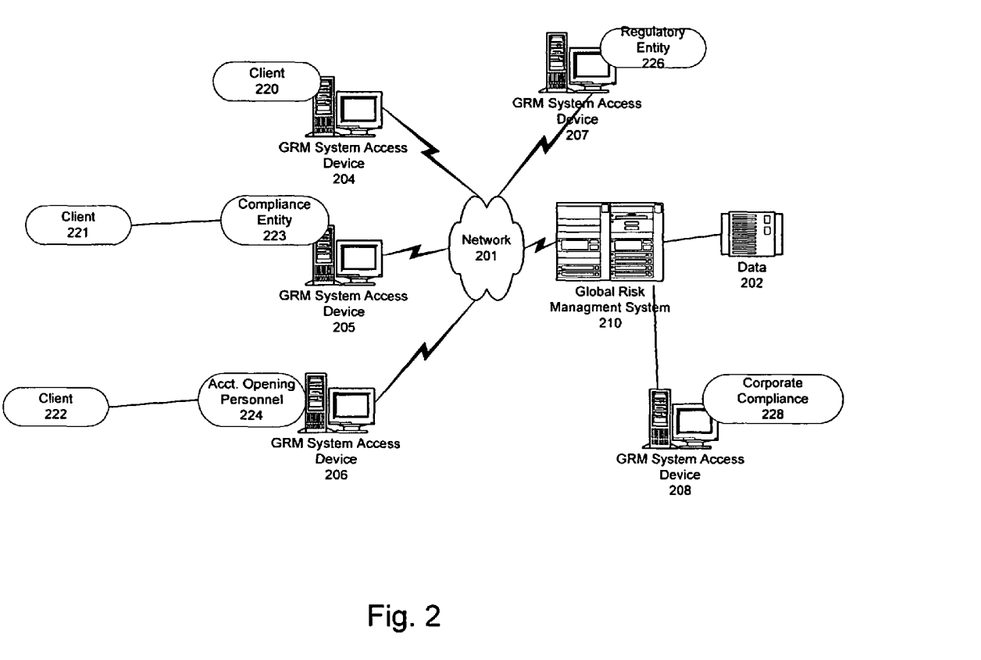
FIG. 2 illustrates a network on computer systems that can embody an automated global risk management system.

Referring now to FIG. 2, a network diagram illustrating one embodiment of the present invention is shown. An automated GRM system 106 can include a computerized GRM server 210 accessible via a distributed network 201 such as the Internet, or a private network. A client 220-222, regulatory entity 226, compliance entity 223, account opening personnel 224, or other party interested in GRM risk management, can use a computerized system or network access device 204-208 to receive, input, transmit or view information processed in the GRM server 210. A protocol, such as the transmission control protocol internet protocol (TCP/IP) can be utilized to provide consistency and reliability.

Each network access device can include a processor, memory and a user input device, such as a keyboard and/or mouse, and a user output device, such as a display screen and/or printer. The network access devices 204-208 can communicate with the GRM server 210 to access data stored at the GRM server 210. The network access device 204-208 may interact with the GRM server 210 as if the GRM server 210 was a single entity in the network 200. However, the GRM server 210 may include multiple processing and database sub-systems, such as cooperative or redundant processing and/or database servers, that can be geographically dispersed throughout the network 201. In some implementations, groups of network access devices 204-208 may communicate with GRM server 210 through a local area network.

The GRM server 210 includes one or more databases 202 storing data relating to GRM risk management. The GRM server 210 may interact with and/or gather data from an operator of a network access device 204-208, such as a client 220-222, compliance entity 223, account opening personnel 224, regulatory entity 226, or other person in control of the device 204-208. Data gathered from an operator may be structured according to risk criteria and utilized to calculate a GRM risk quotient 108.

Typically an operator or other user will access the GRM server 210 using client software executed at a network access device 204-208. The client software may include a generic hypertext markup language (HTML) browser, such as Netscape Navigator or Microsoft Internet Explorer, (a "WEB browser"). The client software may also be a proprietary browser, and/or other host access software. In some cases, an executable program, such as a Java™ program, may be downloaded from the GRM server 210 to the client computer and executed at the client network access device or computer as part of the GRM system software. Other implementations include proprietary software installed from a computer readable medium, such as a CD ROM. The invention may therefore be implemented in digital electronic circuitry, computer hardware, firmware, software, or in combinations of the above. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

Figure 3:
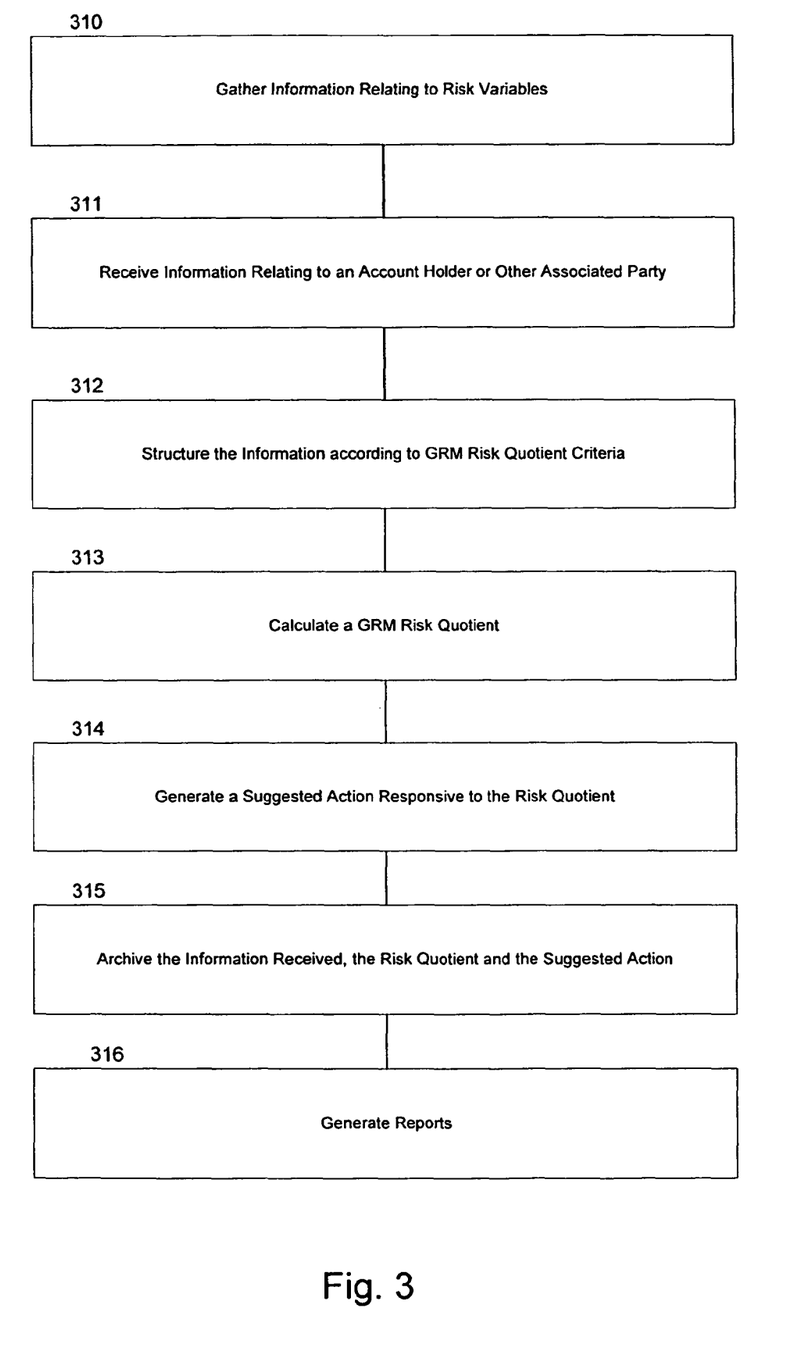
FIG. 3 illustrates a flow of exemplary steps that can be executed by a GRM system.

Referring now to FIG. 3, steps taken to manage risk associated with a financial transaction with global risk exposure can include gathering information relating to risk entities and other risk variables. Informational data can be gathered from a user or from a source of electronic data such as an external database, messaging system, news feed, government agency, or other automated data provider. Typically, the GRM system 106 will receive data relating to a potential account holder, beneficiary or other associated party. Information can be received on an ongoing basis such that if new events occur in the world which affect the political exposure of an account holder, the GRM risk can be adjusted accordingly.

In addition to the types and sources of information listed previously that can provide indications of high risk, the financial institution or compliance entity can receive information that relates to requests to involve a financial institution that is not accustomed to foreign account activity; requests for secrecy or exceptions to Bank Secrecy Act requirements, routing through a secrecy jurisdiction, or missing wire transfer information; unusual and unexplained fund or transaction activity, such as fund flow through several jurisdictions or financial institutions, use of a government-owned bank, excessive funds or wire transfers, rapid increase or decrease of funds or asset value not attributable to the market value of investments, high value deposits or withdrawals, wires of the same amount of funds into and out of the account, and frequent zeroing of account balance; and large currency or bearer transactions, or structuring of transactions below reporting thresholds. Other information can include activities the GRM is involved in, associates of the GRM, governmental changes, or other related events.

Sources of information can include, for example, publications issued by Treasury's Financial Crimes Enforcement Network ("FinCEN"), the State Department, the CIA, the General Accounting Office, Congress, the Financial Action Task Force ("FATF"), various international financial institutions (such as the World Bank and the International Monetary Fund), the United Nations, other government and non-government organizations, internet websites, news feeds, commercial databases, or other information sources.

The GRM server 210 can structure the information received according to defined GRM risk quotient criteria 312. For example, information received can be associated with criteria including a position held by the account holder, the country in which the position is held, how long the position has been held, the strength of the position, the veracity of previous dealings with persons from that country, the propensity of people in similar positions to execute unlawful or unethical transactions, the type of account or other criteria.

Types of accounts to be opened may include, for example: an individual account, a public company domiciled in a G-7 country or Hong Kong, a public company not domiciled in a G-7 country or Hong Kong, a corporate account regulated by a G-7 agency or a corporate account regulated by a non G-7 government agency, a private company or partnership, a holding company, an intermediary managed account such as a money manager or hedge fund, a trust or foundation, or other type of legal entity.

The GRM server 210 can receive information and structure it according to predefined criteria or receive it in a pre-structured format. Receiving the information in a pre-structured format allows the GRM server 210 to proceed with calculating a risk quotient 313 without having to further structure the information. Information that cannot be easily structured can also be received and archived in order to facilitate a manual qualitative evaluation.

A GRM risk quotient can be calculated 313 by weighting the information received according to its importance in determining high risk activities, such as the likelihood of illegal or unethical dealings. Calculating a GRM risk quotient can be accomplished by assigning a numerical value to each field of information, wherein the numerical value is representative of the risk associated with a particular piece of information. For example, it may be determined in one case that a government official from a G-7 country trading equities in a public company from a G-7 country poses minimal risk. Therefore this information from the first case is assigned a low numerical value, or even a negative numerical value. In a second case, an individual who appears on a list generated by the FATF and is attempting to transact in a corporate holding company may be viewed as a high risk. In another case, information conveying this high risk may be assigned a high numerical value. In addition, a weight can be assigned to a GRM risk category to which the information is assigned. Therefore a designated country may receive a higher weight than the position held, or vice versa. A Risk Quotient can be calculated by multiplying a weighted numerical value of the specific information times the category weighting.

For example, information received may indicate an account holder is a high ranking finance official from a G7 country. The ownership structure of a company the account holder wishes to transact is a public entity. A public entity may receive a numerical value of −5 because it is a relatively low risk ownership structure. In addition, this information may be included in a Company Profile category, wherein the Company Profile is assigned a category weighting of 3. Therefore, the net score for this ownership structure is −5 times 3 or −15. Similarly the account holder being a high ranking official from a G-7 country may also receive a low number such as 1. The GRM risk quotient for the account holder would be 1 times 3, or 3. All scores within the Company Profile can be summed to calculate a GRM risk quotient. In this case the GRM risk quotient is −15+3 which equals −12, indicating a low risk. Weighted risk scores from all associated categories can be summed to calculate a total Risk Quotient Score 108.

A suggested action can be generated that is responsive to the Risk Quotient 314. For example, in response to a high risk score a suggested action may be to not proceed with a transaction, or even to notify an authority. In response to a low risk score, the GRM server 210 may respond by completing transactions as usual. Intermediate scores may respond by suggesting that additional information be gathered, that transactions for this account be monitored, or other interim measures.

The GRM server 210 can also store, or otherwise archive GRM data and proceedings. For example the GRM server 210 can store information received, a Risk Quotient generated, and also the suggested actions to be taken 315. This information can be useful to quantify corporate governance and diligent efforts to address high risk situations. Accordingly, reports quantifying GRM risk management procedures, executed due diligence, corporate governance or other matters can be generated 316.

Figure 4:
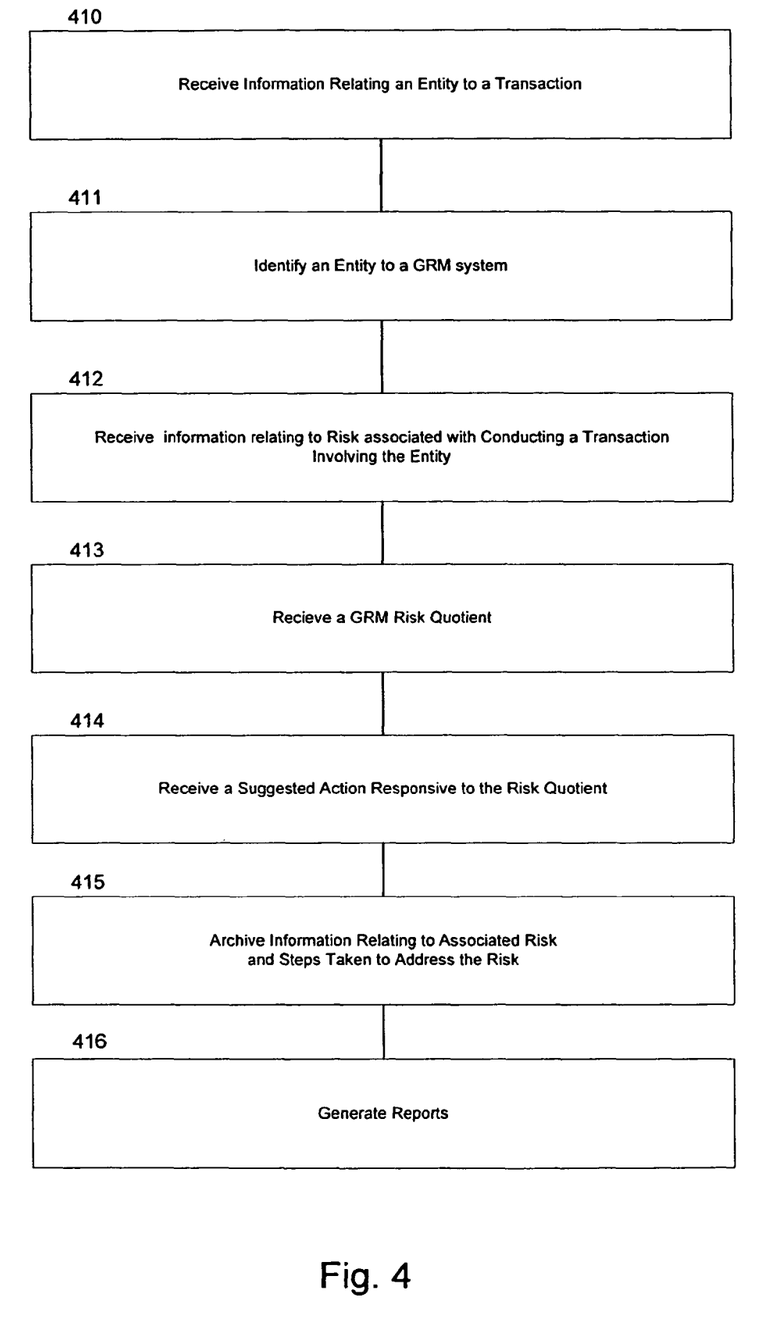
FIG. 4 illustrates a flow of exemplary steps that can taken by a user of the GRM system.

Referring now to FIG. 4, a flow chart illustrates steps that a user, such as a financial institution, can implement to manage risk associated with a transaction. The user can receive information relating to an entity associated with a transaction 410. This information may be received during the normal course of business, such as when the participants to a transaction are ascertained. The user can access a GRM server 210 and identify to the GRM server 210 one or more entities, jurisdictions, or other risk variables involved in the transaction 411. Access can be accomplished by opening a dialogue with a GRM system. Typically, the dialogue would be opened by presenting a GUI to a network access device accessible by a person or an electronic feed that will enter information relating to the account holder. The GUI will be capable of accepting data input via a network access device. An example of a GUI would include a series of questions relating to a client holding an account. Alternatively, information can be received directly into fields of a database, such as from a commercial data source. Questions can be fielded during a transaction, while updating account information, during an account opening interview, or at any other opportunity to gather information.

In one embodiment, automated monitoring software can run in the background of a normal transaction program and screen data traversing an application. The screened data can be processed to determine key words wherein the key words can in turn be presented to the GRM server 210 as risk variables. The GRM server 210 will process the key words to identify entities or other risk variables and score those variables according to weighted criteria. Monitoring software can also be installed to screen data traversing a network or communications link.

The user will receive back information relating to risk associated with conducting a transaction involving the submitted variables 412. The user will also receive a GRM Risk Quotient 413. As addressed more completely above, the risk quotient is typically a scaled numerical score based upon values for weighted criteria. It will represent a magnitude of risk associated with a particular transaction and can be based upon the participants involved in a transaction, the type of transaction, the state sovereignties involved, an amount of money involved in the transaction, or other risk variables.

In addition to receiving the GRM risk quotient 413, the user can also receive one or more suggested actions responsive to the risk quotient 414. A suggested action can include reasonable steps that can be taken by the financial institution or other user to address a risk that is associated with the transaction. The user can also archive information relating to risk associated with a transaction as well as steps taken to address the risk 415. The process involved in utilizing the GRM system can be included in the archive as steps taken to diligently manage risk associated with a global transaction.

The user can also generate reports to quantify the archived information and otherwise document diligent actions taken relating to risk management.

Figure 5:
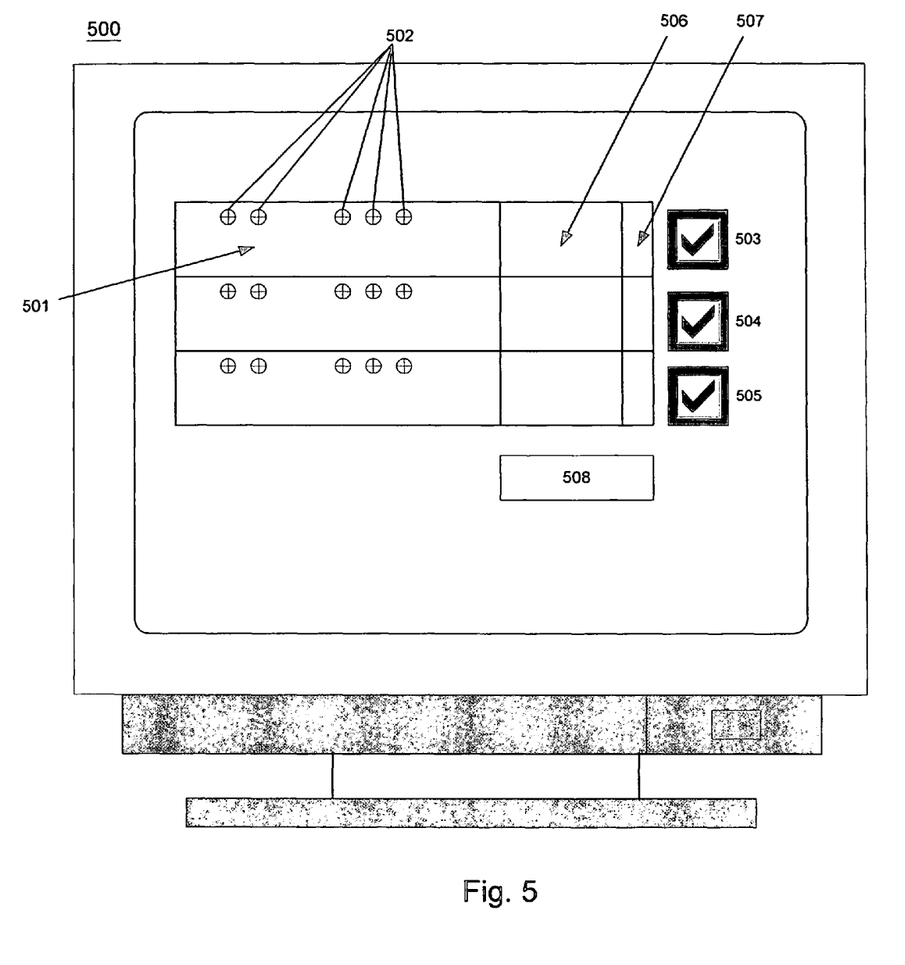
FIG. 5 illustrates an exemplary graphical user interface useful for gathering information according to the present invention.

Referring now to FIG. 5, an exemplary GUI for displaying information related to GRM is illustrated 500. The GUI can include areas prompting for information, such as in the form of a key word or a question 501. Areas can also be included for an appropriate response 506. The area for an appropriate response 506 can, for example, receive text, allow a selection from choices proffered, or otherwise receive data into the GRM server 210. A programmable user interactive device, such as a checkbox, X field, yes/no filed or other device 503-505 can also be utilized to indicate an answer, or otherwise input information. Other programmable devices, such as programmable icons, hyperlinks, push buttons or other devices 502 can also be utilized to execute a particular function. A category weighting area 507 can also be indicated on the GUI 500. Typically the weighting will be predetermined. However, if desired the weighting can be modified by a user such that a weighting value, such as a numerical value, will be utilized to calculate a risk quotient. The GRM GUI 500 can also include an area for displaying a quotient score relating to the transaction 508.

Figure 6:
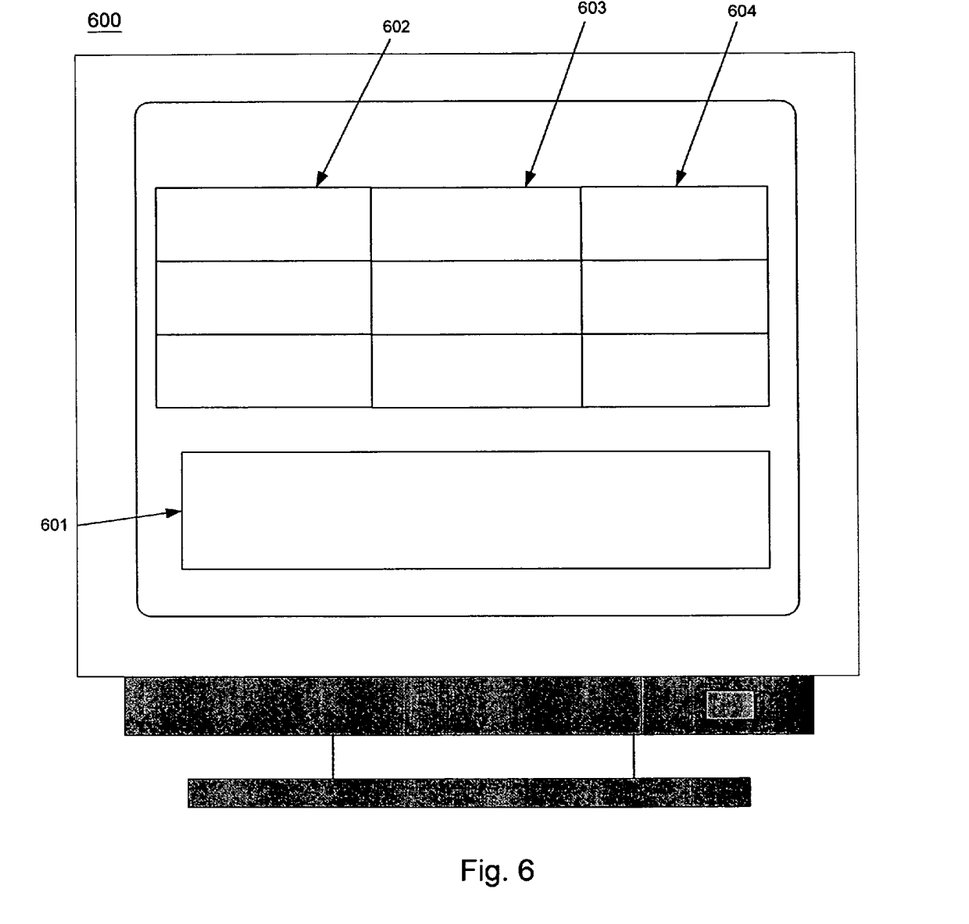
FIG. 6 illustrates an exemplary graphical user interface useful for presenting reports related to GRM.

Referring now to FIG. 6, an exemplary GUI for presenting reports or suggested actions related to GRM is illustrated 600. The GUI for presenting reports 600 can include geographic areas of a user interface containing risk management procedures 601, including those procedures specifically followed in relation to a particular GRM or other suggested actions. Additional areas can include a list of electronic or hardcopy reports available concerning risk management efforts undertaken 602. Another area can include a list of risk quotients and/or calculations concerning a risk quotient, such as the average risk quotient for the financial institution, or the mean risk quotient 603. Still another area can contain information descriptive of a particular account holder or GRM 604.

A number of embodiments of the present invention have been described. Nevertheless, it will be understood that various modifications may be made without departing from the spirit and scope of the invention. For example, network access devices 204-208 can comprise a personal computer executing an operating system such as Microsoft Windows™, Unix™, or Apple Mac OS™, as well as software applications, such as a JAVA program or a web browser. network access devices 204-208 can also be a terminal device, a palm-type computer, mobile WEB access device, a TV WEB browser or other device that can adhere to a point-to-point or network communication protocol such as the Internet protocol. Computers and network access devices can include a processor, RAM and/or ROM memory, a display capability, an input device and hard disk or other relatively permanent storage. Accordingly, other embodiments are within the scope of the following claims.

What is claimed is:

1. A computer-implemented method for managing risk related to a financial transaction, the method comprising:

gathering into a computer storage legal and reputational risk information related to a proposed financial transaction, the legal and reputational risk information including duty of disclosure risk information, and financial infraction prevention information;

receiving into the computer storage transaction information relating to details of the proposed financial transaction;

structuring with a processor the received transaction information according to risk quotient criteria associated with the gathered legal and reputational risk information;

assigning a numerical value representative of risk to the structured transaction information;

assigning the structured transaction information to an associated risk category having a category weight;

calculating a risk quotient by multiplying a weighted numerical value by the category weight, wherein the weighted numerical value is derived from the assigned numerical value of the structured transaction information;

determining a suitability of the proposed financial transaction according to the received transaction information and the calculated risk quotient;

generating a suggested action in accordance with the risk quotient;

generating a structured history derived from the received transaction information; and creating a report from the generated structured history, the calculated risk quotient, the determined suitability, and the generated suggested action.

2. The method of claim 1, additionally comprising: storing the received transaction information, the risk quotient and the suggested action; and generating a diligence report referencing the stored information.

3. The method of claim 2, wherein the diligence report comprises the received transaction information relating to details of the financial transaction and actions taken in response to the risk quotient.

4. The method of claim 1, wherein the suggested action is additionally responsive to the transaction information received.

5. The method of claim 1, wherein the suggested action comprises refusing to perform the financial transaction.

6. The method of claim 1, wherein the suggested action comprises blocking acceptance of an account.

7. The method of claim 1, wherein the suggested action comprises notifying an authority.

8. The method of claim 1, wherein the received transaction information comprises an identity of a high risk entity and the high risk entity's relationship to an account holder.

9. The method of claim 1, wherein the received transaction information comprises an identity of a secrecy jurisdiction.

10. The method of claim 1, wherein the received transaction information is gathered electronically.

11. The method of claim 1 additionally comprising aggregating risk quotients relating to a financial institution to assess a level of identified risk to which the financial institution is exposed.

12. The method of claim 1, additionally comprising calculating an average risk quotient associated with the financial transaction.

13. The method of claim 1 wherein the financial transaction comprises opening a financial account.

14. The method of claim 1, wherein the risk quotient is indicative of an amount or monetary cost of defending an adverse position or a fine associated with a financial institution of the proposed financial transaction.

15. The method of claim 1, wherein the gathering of the legal and reputational risk information and the receiving of the proposed transaction information is achieved responsive to an automated data provider output, with the risk quotient being adjusted accordingly.

16. The method of claim 1, wherein the risk quotient is generated in response to an event or according to a request.

17. The method of claim 1, further comprising generating a total risk quotient by aggregating the risk quotient of all associated risk categories.

18. The method of claim 1, wherein the assigned numerical value and the category weight are user-defined.

19. The method of claim 1, wherein the gathered risk information includes information related to regulatory risk, risk advisories, historical data and world events.

20. A computerized system for managing risk associated with a financial transaction, the system comprising:

a computer server accessible with a network access device via a communications network and executable software stored on the server and executable on demand, the software operative with the server to cause the system to:

gather legal and reputational risk information related to a proposed financial transaction, the legal and reputational risk information including
duty of disclosure risk information, and
financial infraction prevention information;

receive transaction information relating to details of the proposed financial transaction;

structure the received transaction information according to risk quotient criteria associated with the gathered legal and reputational risk information;

assign a numerical value representative of risk to each structured transaction information;

assign the structured information to an associated risk category, wherein the risk category is associated with a category weight;

calculate a risk quotient by multiplying a weighted numerical value by the category weight, wherein the weighted numerical value is derived from the assigned numerical value of the structured transaction information;

determine a suitability of the proposed financial transaction according to the received transaction information and the calculated risk quotient;

generate a suggested action in accordance with the risk quotient;

generate a structured history derived from the received transaction information; and create with the processor a report from the generated structured history, the calculated risk quotient, the determined suitability, and the generated suggested action.

21. The computerized system of claim 20, wherein the transaction information is received via an electronic feed.

22. The computerized system of claim 20, wherein the transaction information received is generated by a government agency.

23. The computerized system of claim 20 wherein the network access device is a personal computer.

24. The computerized system of claim 20 wherein the network access device is a wireless handheld device.

25. A non-transitory computer-readable medium having computer-executable program instructions residing thereon, wherein the computer-executable program instructions are issuable by a computer to:

gather legal and reputational risk information related to a proposed financial transaction, the legal and reputational risk information including
duty of disclosure risk information, and
financial infraction prevention information;

receiving into the computer storage transaction information relating to details of the proposed financial transaction;

structure the received transaction information according to risk quotient criteria associated with the gathered legal and reputational risk information;

assign a numerical value representative of risk to the structured transaction information;

assign the structured transaction information to an associated risk category having a category weight;

calculate a risk quotient by multiplying a weighted numerical value by the category weight, wherein the weighted numerical value is derived from the assigned numerical value of the structured transaction information;

determine a suitability of the proposed financial transaction according to the received transaction information and the calculated risk quotient;

generate a suggested action in accordance with the risk quotient;

generate a structured history derived from the received transaction information; and create a report from the generated structured history, the calculated risk quotient, the determined suitability, and the generated suggested action.

* * * * *